(12) United States Patent
Rebello et al.

(10) Patent No.: US 6,430,455 B1
(45) Date of Patent: Aug. 6, 2002

(54) MANAGING HOW CURRENT FILES OF A PRODUCT ARE AT THE TIME OF RELEASE

(75) Inventors: Alexander Bernard Flavian Rebello; Michael Wladyslaw Sobolewski, both of Clifton Park; Michael Adam Kinstrey, Ballston Spa, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/236,425

(22) Filed: Jan. 25, 1999

(51) Int. Cl.$^7$ .............................................. G06F 19/00
(52) U.S. Cl. .................... 700/105; 700/102; 700/97; 700/179; 700/182; 700/98; 707/104.1; 707/201; 707/204; 707/203; 707/205; 707/511; 703/2; 703/1; 703/22
(58) Field of Search ............................ 700/179, 95, 96, 700/97, 98, 99, 102, 103, 104, 105, 117, 118, 163, 181, 182; 707/8–10, 203, 204–205, 506.1, 511, 512, 513, 514, 104.1, 201; 709/204; 703/1–2, 22; 702/57

(56) References Cited

U.S. PATENT DOCUMENTS

| | | | |
|---|---|---|---|
| 4,558,413 A | * 12/1985 | Schmidt et al. ............ | 707/203 |
| 5,191,534 A | * 3/1993 | Orr et al. .................... | 700/105 |
| 5,317,729 A | * 5/1994 | Mukherjee et al. ......... | 700/108 |
| 5,649,200 A | * 7/1997 | Leblang et al. ............. | 707/203 |
| 5,659,478 A | * 8/1997 | Pennisi et al. .............. | 700/119 |
| 5,687,094 A | * 11/1997 | Kagawa et al. ............... | 700/98 |
| 5,729,463 A | * 3/1998 | Koenig et al. ................ | 700/98 |
| 5,812,402 A | * 9/1998 | Nishiyama et al. ........... | 700/97 |
| 5,878,408 A | * 3/1999 | Van Huben et al. ............ | 707/1 |
| 6,036,345 A | * 3/2000 | Jannette et al. ................ | 700/98 |
| 6,065,857 A | * 5/2000 | Hazama et al. ............... | 700/95 |

* cited by examiner

Primary Examiner—Ramesh Patel
(74) Attorney, Agent, or Firm—David C. Goldman; Jill M. Breedlove

(57) ABSTRACT

A system and method for managing the currentness of files of a product at the time of release to manufacturing. A data extractor and populator extracts attributes of features in a master model and populates the extracted information in drawing files and NC machining data files. A version control system manages versions of the master model and the files. A release unit releases a version of the files that is current with the latest version of the master model.

38 Claims, 4 Drawing Sheets

MANAGING HOW CURRENT FILES OF A PRODUCT ARE AT THE TIME OF RELEASE

BACKGROUND OF THE INVENTION

This invention relates generally to computer-aided design (CAD) and computer-aided manufacturing (CAM) and more particularly to determining whether files generated from a CAD/CAM system are current at the time of release to manufacturing.

Typically, a designer uses a CAD/CAM system for designing and manufacturing a part. In particular, the designer uses the CAD/CAM system to generate a model (e.g., a two or three dimensional model) of the part. After generating the model, the designer uses the CAD/CAM system to manually prepare a set of drawings of the design and generate numerical control (NC) machining data. If the drawings and the NC machining data are satisfactory, then the designer releases them to manufacturing for production of the part. Sometimes during manufacturing a problem may arise which necessitates a revision to the design of the part. When a revision is necessary, the designer has to make changes to the model as well as to the drawings and the NC machining data. Before making revisions to the model, the drawings and the NC machining data, the designer has to make sure that he or she is working with the latest version.

Determining whether one is working with the latest version is not that easy because it is quite likely that others may have made several changes to the model, the drawings or the NC machining data after their original release to manufacturing. Some of these changes may not be apparent to the next user. For example, a few of the currently available CAD/CAM systems are able to directly associate information in the drawings and the NC machining data with the model. This capability allows associated information in the drawings and the NC machining data to be treated as a collection. Thus, changes to the associated information in the model are propagated to the related files for the drawings or the NC machining data. These changes are apparent to the next user, however, there is a significant portion of information needed to manufacture the part that is not directly associable with the model. Notes, annotations, numerical analysis results, design data book parameters and calculations and surface finish requirements are examples of some information that is not directly associable with the model, even though it may be represented or derived from the information contained in the model. Changes to information that does not necessarily propagate from the model to the drawings or the NC machining data will not be readily apparent to the next user. In order to make any necessary revisions, it is necessary that persons downstream of conceptual design be able to access the most current model, drawings and NC machining data. This will avoid costly mistakes and reduce the time that a product is brought to market. Therefore, there is a need for a system and method that can manage the currentness of models, drawings and NC files in a design and manufacturing environment.

BRIEF SUMMARY OF THE INVENTION

In accordance with this invention, there is provided a system, a method and an article of manufacture for managing how current files of a product are at the time of release. In this invention, there is a master model of the product. Also, there is at least one data file generated from the master model, wherein the at least one data file comprises data non-associated with the master model. A version control system manages versions of the master model and the at least one data file. The version control system comprises means for defining dependencies between versions of the at least one data file and the master model. A release unit releases a version of the at least one data file that is current with the latest version of the master model.

DETAILED DESCRIPTION OF THE INVENTION

Figure 1:
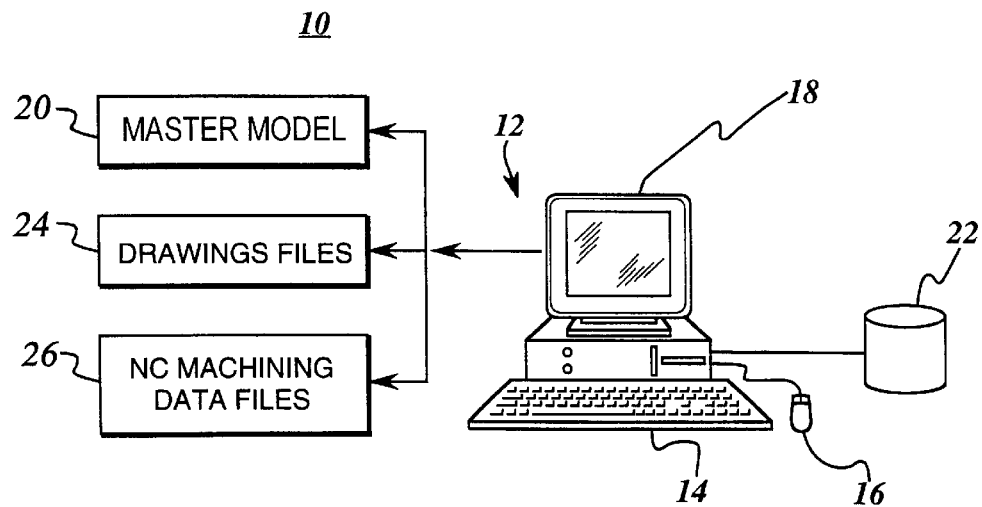
FIG. 1 shows a block diagram of a system for managing the currentness of a model, drawings and NC machining files according to this invention.

FIG. 1 shows a block diagram of a system 10 for managing the currentness of a model, drawings and NC machining files according to this invention. The system 10 comprises a computer workstation 12 such as a CAD/CAM system containing a keyboard 14, a mouse device 16 and a monitor 18. The CAD/CAM system 12 may be any commercially available system such as an Unigraphics CAD/CAM system or a NuForm CAD/CAM system. The CAD/CAM system 12 comprises a processor and memory including random access memory (RAM), read only memory (ROM) and/or other components. The CAD/CAM system 12 operates under control of an operating system stored in the memory to present data on the display of the monitor and to accept and process commands via the keyboard 14 and the mouse device 16.

The CAD/CAM system 12 contains one or more computer programs for implementing this invention. A computer-readable medium such as a fixed data storage device tangibly embody the computer programs and the CAD/CAM's operating system. The computer programs are programmed in C, but other languages such as FORTRAN, C++, JAVA, etc. may be used. A designer uses the computer programs stored in the CAD/CAM system 12 through a graphical user interface to generate a master model 20 from a plurality of model features stored in a database 22. A data population and extraction program extracts attributes from the model features used in the master model, and automatically populates the extracted attributes into data files such as drawings 24 and NC machining data files 26. A version control program manages the versions of the master model, drawing files and the NC machining files as well as associates a parent child relationship between the drawing files and the NC machining files and the master model. A release program determines if the drawing files or the NC machining files released for manufacture are current. In particular, the release program determines whether the master model has changed since the drawing files or NC machining files have been generated or updated. This is done by determining whether the parent master model of the dependent drawing and NC machining files is the most current version of that model.

Figure 2:
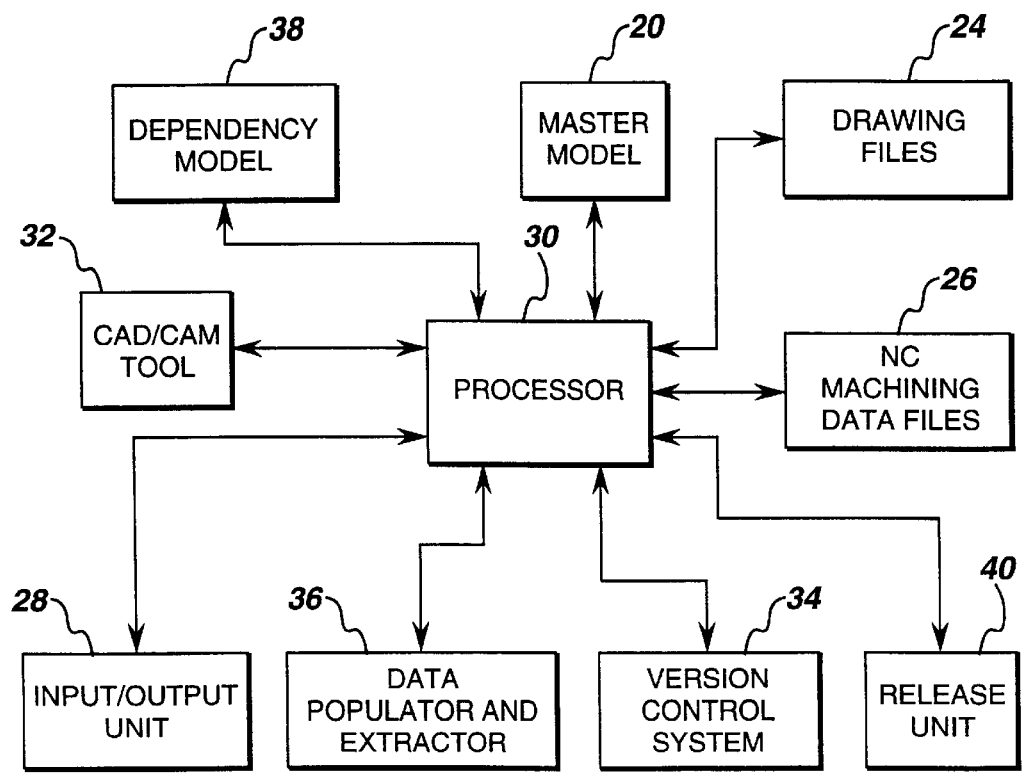
FIG. 2 shows a block diagram of the processing architecture of the system shown in FIG. 1.

FIG. 2 shows a block diagram of the processing architecture of this invention. A designer accesses the system 10 via an input/output unit 28. A processor 30 is responsive to the inputs made by the designer via the input/output unit 28. In order to enable the designer to design a product, the processor 30 uses a CAD/CAM tool 32. The designer uses the CAD/CAM tool 32 to build the master model 20 of the design from a plurality of model features. After building the master model 20, the processor 30 executes a version control system 34 for managing the model. The version control system 34 compares the contents of the current version of the master model 20 already in the version control system with the newly generated or updated version. If differences do exist, then the version control system 34 stores the new version of the model and assigns a time stamp thereto to indicate the time and date. The version control system 34 uses a time stamp log to record each time stamp assigned for the model. Alternatively, if there is no difference in the contents between the versions, then the version control system 34 maintains the current version of the master model.

The processor 30 uses a data extractor and populator 36 to extract attributes of features used in the master model 20. After extracting the data from the master model 20, the data extractor and populator 36 populates the extracted data in the drawing files 24 and NC machining data files 26. A more detailed discussion of the data extractor and populator 36 is set forth in U.S. patent application Ser. No. 09/236,424, entitled EXTRACTING DATA FROM AN N-DIMENSIONAL MODEL AND POPULATING FILES WITH THE EXTRACTED DATA filed concurrently herewith, is incorporated herein by reference. Each drawing file and NC data file populated by the data extractor and populator 36 contains a means for logging a time stamp when the data extraction and population program is executed.

The processor 30 executes the version control system 34 as the data populator and extractor 36 populates the drawing files 24 and the NC machining data files 26. After the drawing files 24 and the NC machining data files 26 have been populated, the version control system 34 compares the contents of the current version of the drawing files and NC data files already in the version control system with the newly populated version. If differences do exist, then the version control system 34 stores the new version of the files and assigns a time stamp thereto to indicate the time and date. The time stamp is generated by checking with the real time computer clock. Alternatively, if there is no difference in the contents between the versions, then the version control system 34 maintains the current version of the files.

The version control system 34 also examines the files and defines the dependencies between the files. The dependencies include information in the drawing files 24 and the NC data files 26 that is associated with that in the master model 20. The version control system 34 places the defined dependencies in a dependency model 38. The dependency model defines which specific files define information which if changed affect the consistency, quality and accuracy of information in other specific files. In this invention, the dependency model 38 is not limited to a dependency configuration and can be either a hierarchical or chain model.

When it comes time to release the drawing files 24 and NC data files 26 to manufacturing, the processor 30 executes the release unit 40 which contains a release program for determining if the files being released are current. The release program determines if the files are current by determining whether the parent master model of the dependent drawing and NC machining files is the most current version of that model. This is done by using the version control system 34 and the dependency model 38 to find the parent model and the dependent files and compare the logged time stamp of the dependent files with the parent model. If the parent model has an earlier time stamp than that of the dependent files, then the dependent files are current. Otherwise, the dependent model and all of the files that depend on it are not current. The processor 30 informs the user through the input/output unit 28 as to whether the files are current. If the files are not current, then the processor informs the user that the files are not current and release to manufacturing cannot proceed. Alternatively, if the files are current, then the files can be released to manufacturing.

Figure 3:
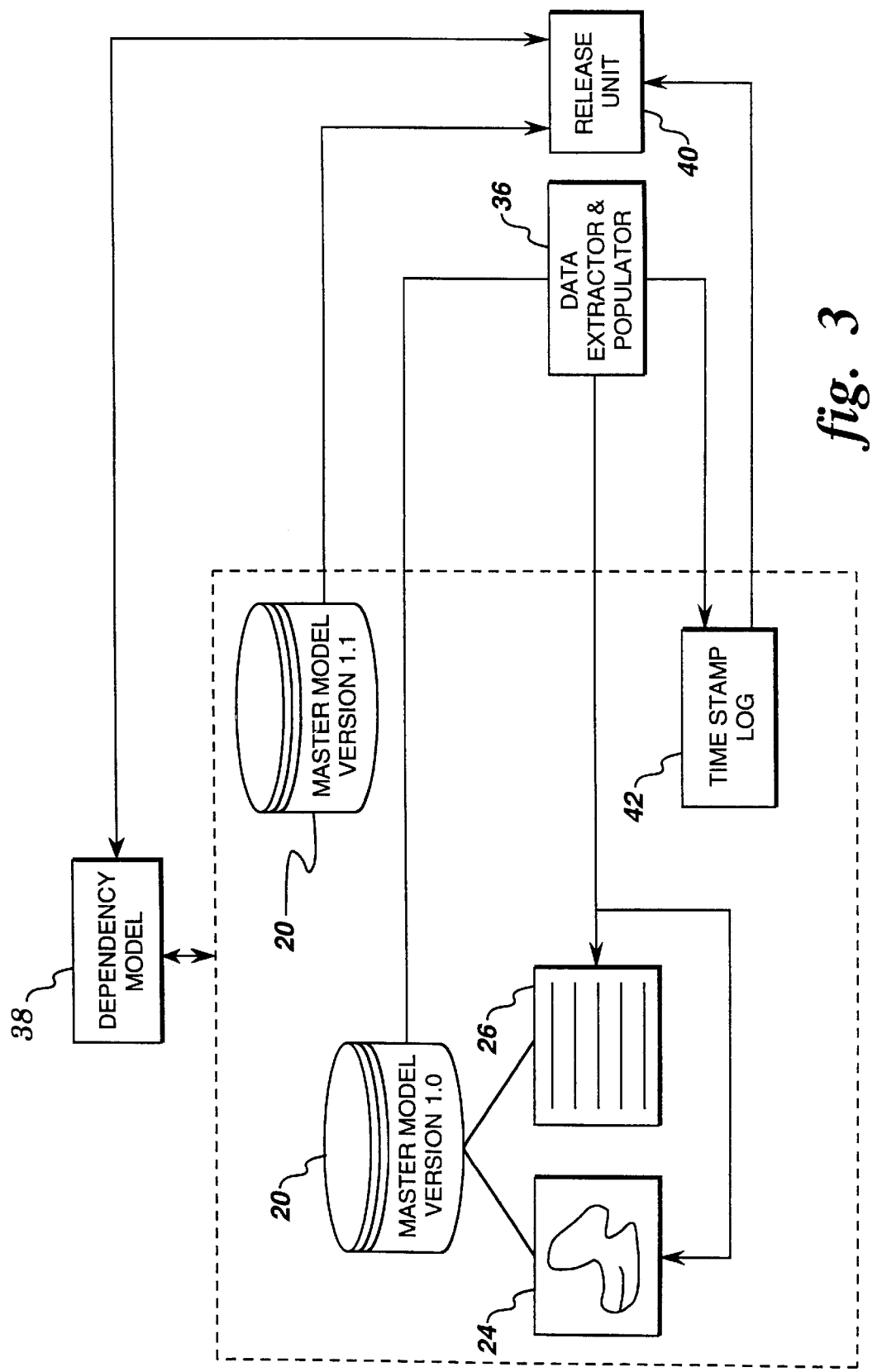
FIG. 3 shows a more detailed view of the architecture shown in FIG. 2.

FIG. 3 shows a more detailed view of the architecture shown in FIG. 2. In FIG. 3, the version control system 34 contains two versions of a master model 20 (i.e., version 1.0 and version 1.1). The data extractor and populator 36 extracts data from master model version 1.0 and populates it into the drawing file 24 and an NC machining data file 26. A time stamp log 42 in the version control system 34 records each time stamp assigned for the drawing file 24 and the NC machining data file. The version control system 34 compares the contents of the current version of the drawing files and NC data files already in the version control system with the newly populated version. If differences do exist, then the version control system 34 stores the new version of the files and assigns a time stamp thereto to indicate the time and date. If there is no difference in the contents between the versions, then the version control system 34 maintains the current version. The version control system 34 puts dependency information from the drawing file 24 and the NC data file 26 into the dependency model 38. When it comes time to release the drawing file 24 and NC data file 26 to manufacturing, the release unit 40 determines if the files being released are current in the above-described manner.

In order to release the master model version 1.1, the version control system 34 will compare the contents of the current version of the master model already in the version control system with the newly generated or updated master model version 1.1. If differences do exist, then the version control system 34 stores the new version 1.1 of the model and assigns a time stamp thereto to indicate the time and date. If there is no difference in the contents between the versions, then the version control system 34 maintains the current version of the master model.

Figure 4:
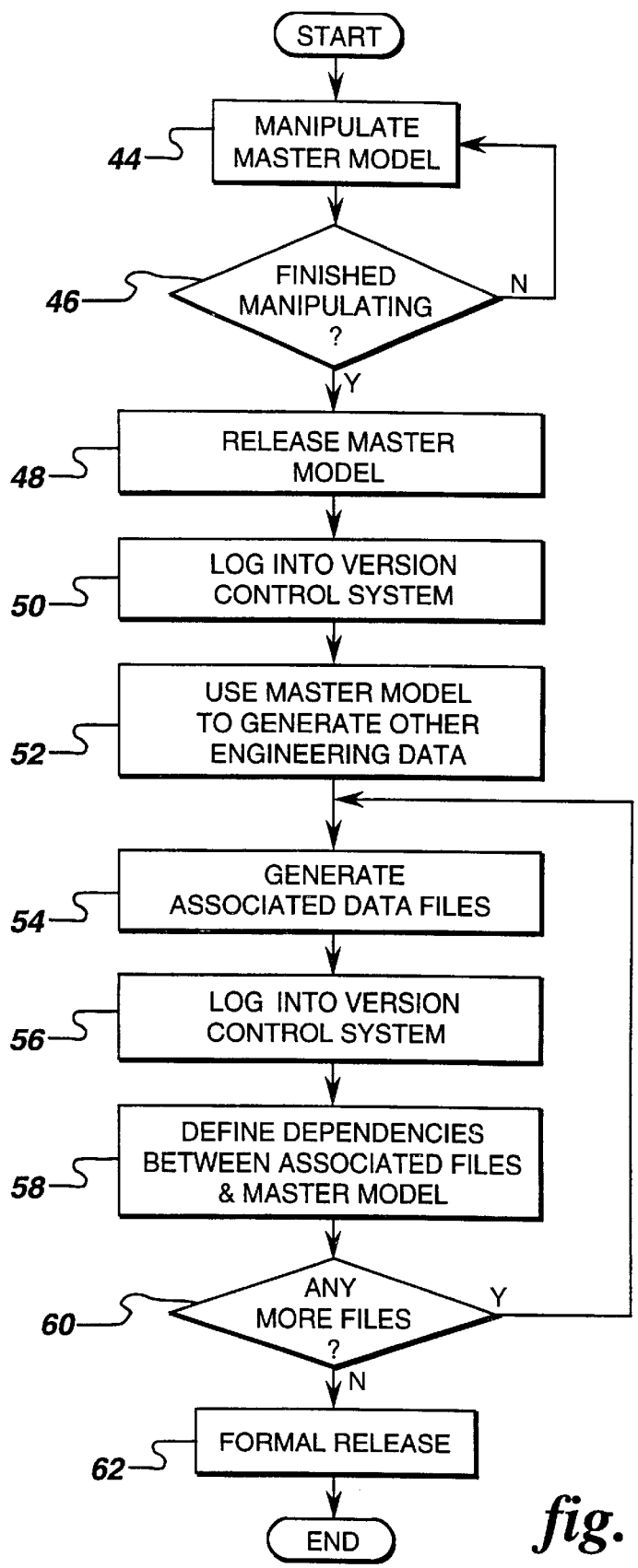
FIG. 4 shows a flow chart setting forth the steps performed according to this invention.

FIG. 4 shows a flow chart setting forth the steps performed in this invention. FIG. 4 starts at 44 where the designer manipulates the master model to make changes thereto. The manipulation of the master model continues until the designer finishes as determined at 46. The designer releases the master model at 48. The release performed here is not the same as the formal release performed by the release unit 40. The release performed at block 48 includes checking the master model to determine if it is fixed so that others can work from it. After the master model has been released, then the processor logs into the version control system at 50. The version control system 34 compares the contents of the current version of the master model 20 already in the version control system with the released version. If differences do exist, then the version control system 34 stores the new version of the model and assigns a time stamp thereto to indicate the time and date. If there is no difference in the contents between the versions, then the version control system 34 maintains the current version of the master model.

At 52, the master model is used to generate other engineering data. For example, the master model may be used to generate a numerical analysis model for functionality or manufacturability evaluation. Also, information from the master model may be used to calculate manufacturing parameters. These functions may be done manually or programmatically as in the case of the data extractor and populator, which puts this data into data files associated with the master model at 54. In particular, the data extractor and populator extract attributes of features used in the master model to drawing files and NC machining files. While the data extractor and populator are extracting and populating data into the associated files, the processor logs into the version control system at 56. The version control system 34 compares the contents of the current version of the drawing files and NC data files already in the version control system with the newly populated version. If differences do exist, then the version control system 34 stores the new version of the files and assigns a time stamp thereto to indicate the time and date. If there is no difference in the contents between the versions, then the version control system 34 maintains the current version. In addition, the version control system examines each of the files and defines the dependencies between the files at 58. Steps 54–58 are repeated until it is determined at 60 that there are no more files. When dependencies have been defined for all of the files, then the formal release is initiated at 62.

Figure 5:
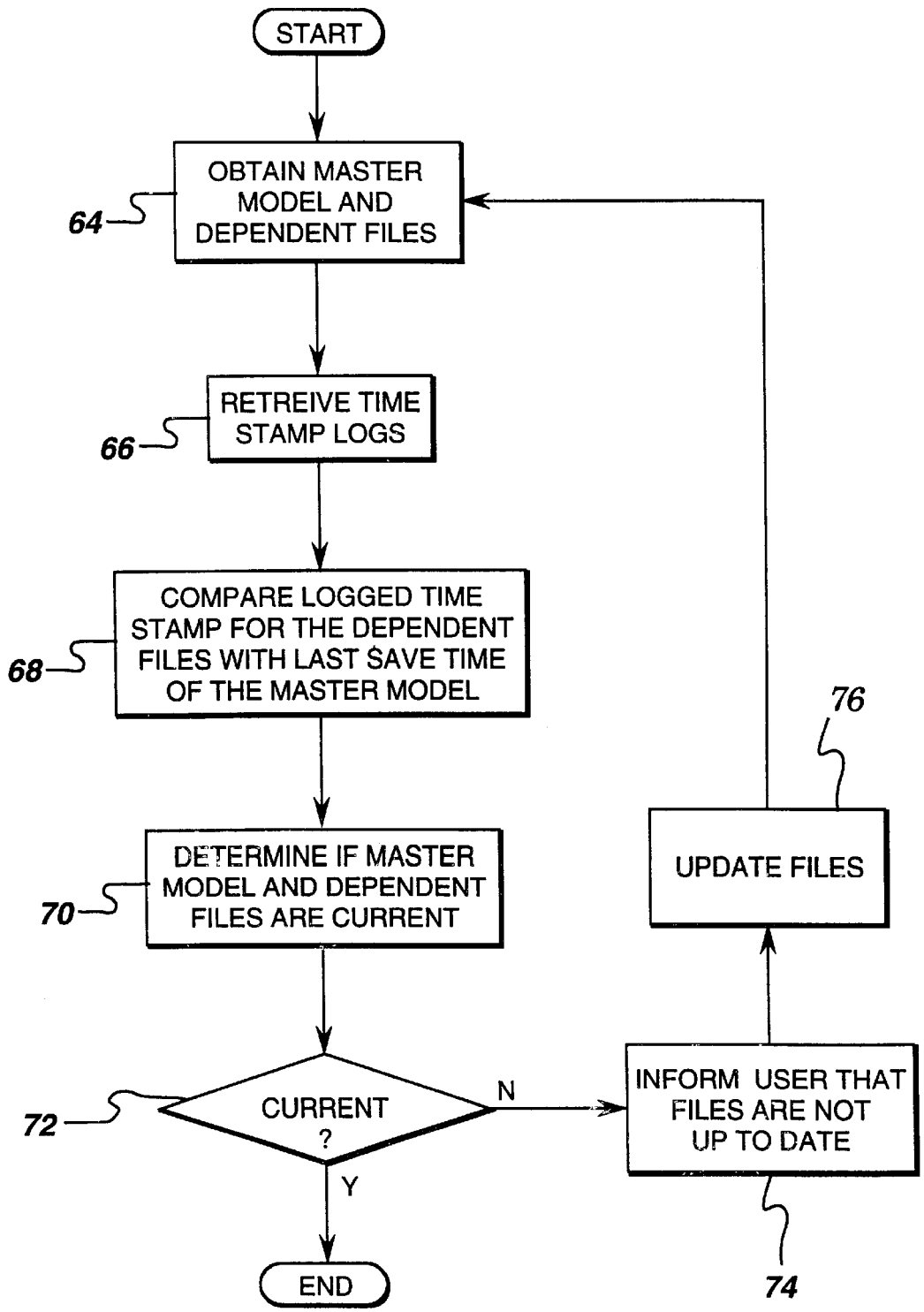
FIG. 5 shows a flow chart setting forth the steps performed by the release unit shown in FIG. 2.

FIG. 5 shows a flow chart setting forth the steps of the formal release. In the formal release, the release unit 40 obtains the master model and dependent files from the version control system at 64. Also, the release unit 40 retrieves the time stamp log from the version control system at 66. The release unit compares the logged time stamp for the dependent files with the last save time of the master model at 68. At 70, the release unit determines if the master model and the dependent files are current. If the files are current as determined at 72, then the formal release is finished, however, if the files are not current, then the user is informed that the files are not up to date at 74. The files are then updated at 76 and steps 64–72 are repeated until the files are current.

It is apparent that there has been provided in accordance with the present invention, a system and method for managing how current files of a product are at the time of release in a design and manufacturing environment. Advantages of this invention are that costly mistakes are avoided and that time to bring a product to market is reduced. Other advantages include discovery of inconsistencies, the ability to incorporate agility and concurrent engineering into design processes and divide roles across and between organizational structures quickly and efficiently.

While the invention has been particularly shown and described in conjunction with a preferred embodiment thereof, it will be appreciated that variations and modifications can be effected by a person of ordinary skill in the art without departing from the scope of the invention.

What is claimed is:

1. A system for managing how current files of a product are at time of release, comprising:
   a master model of the product;
   a plurality of data files arbitrarily associated with the master model;
   a version control system for managing versions of the master model and the plurality of data files according to dependencies defined for the associations between the master model and the plurality of data files; and
   a release unit for releasing a version of any of the plurality of data files that is current with the latest version of the master model.

2. The system according to claim 1, wherein each of the plurality of data files comprise a view of the master model.

3. The system according to claim 1, wherein the plurality of data files comprise NC data files.

4. The system according to claim 1, further comprising a data extraction and population unit for extracting data from the master model and populating the extracted data in the plurality of data files.

5. The system according to claim 1, wherein the version control system comprises a time stamp log for logging time stamps at which the master model and the plurality of data files have been processed.

6. The system according to claim 5, wherein the release unit compares the time stamps for the plurality of data files with the latest time stamp of the master model.

7. The system according to claim 1, wherein the version control system further comprises means for comparing contents of the master model and the plurality of data files with current versions thereof.

8. The system according to claim 1, wherein the version control system further comprises means for defining dependencies between versions of the plurality of data files and a chain of dependencies with the master model as the root.

9. A method for managing how current files of a product are at time of release, comprising:
   obtaining a master model of the product;
   generating a plurality of data files arbitrarily associated with the master model;
   defining dependencies between the plurality of data files and the master model;
   managing versions of the master model and the plurality of data files in accordance with the defined dependencies; and
   releasing a version of any of the plurality of data files that is current with the latest version of the master model.

10. The method according to claim 9, wherein each of the plurality of data files comprise a view of the master model.

11. The method according to claim 9, wherein the plurality of data files comprise NC data files.

12. The method according to claim 9, further comprising extracting data from the master model and populating the extracted data in the plurality of data files.

13. The method according to claim 9, wherein the managing of versions comprises logging time stamps at which the master model and the plurality of data files have been processed.

14. The method according to claim 13, wherein the releasing of a version comprises comparing the time stamps for the plurality of data files with the latest time stamp of the master model.

15. The method according to claim 9, wherein the managing of versions comprises comparing contents of the master model and the plurality of data files with current versions thereof.

16. The method according to claim 9, wherein the defining dependencies comprises versions of the plurality of data files and a chain of dependencies with the master model as the root.

17. An article of manufacture, comprising:
   a computer usable medium containing computer readable program code means embodied therein for managing how current files of a product are at time of release, the computer readable program code means in the article of manufacture comprising:
   computer readable program code means for obtaining a master model of the product;
   computer readable program code means for generating a plurality of data files arbitrarily associated with the master model;

computer readable program code means for defining dependencies between the plurality of data files and the master model;

computer readable program code means for managing versions of the master model and the plurality of data files in accordance with the defined dependencies; and computer readable program code means for releasing a version of any of the plurality of data files that is current with the latest version of the master model.

18. The article of manufacture according to claim 17, wherein each of the plurality of data files comprise a view of the master model.

19. The article of manufacture according to claim 17, wherein the plurality of data files comprise NC data files.

20. The article of manufacture according to claim 17, further comprising computer readable program code means for extracting data from the master model and populating the extracted data in the plurality of data files.

21. The article of manufacture according to claim 17, wherein the managing computer readable program code means comprises computer readable program code means for logging time stamps at which the master model and the plurality of data files have been processed.

22. The article of manufacture according to claim 21, wherein the releasing computer readable program code means comprises computer readable program code means for comparing the time stamps for the plurality of data files with the latest time stamp of the master model.

23. The article of manufacture according to claim 17, wherein the defining dependencies computer readable program code means comprises versions of the plurality of data files and a chain of dependencies with the master model as the root.

24. A system for managing how current files of a product are at time of release, comprising:
a plurality of data files, wherein each data file has an arbitrarily association with the other data files;
a version control system for managing versions of the plurality of data files according to dependencies defined for the arbitrary associations between each of the plurality of data files; and
a release unit for releasing a version of any of the plurality of data files that is current with the latest version of another associated data file.

25. The system according to claim 24, further comprising a data extraction and population unit for extracting data from any of the plurality of data files and populating the extracted data in an associated data file.

26. The system according to claim 24, wherein the version control system comprises a time stamp log for logging time stamps at which any of the associated data files have been processed.

27. The system according to claim 26, wherein the release unit compares the time stamps for any of the plurality of data files with the latest time stamp of their associated data files.

28. The system according to claim 24, wherein the version control system further comprises means for comparing contents of any of the plurality of data files and their associated data files with current versions thereof.

29. A method for managing how current files of a product are at time of release, comprising:

generating a plurality of data files, wherein each data file has an arbitrarily association with the other data files;

defining dependencies for the arbitrary associations between each of the plurality of data files;

managing versions of the plurality of data files in accordance with the defined dependencies; and releasing a version of any of the plurality of data files that is current with the latest version of another associated data file.

30. The method according to claim 29, further comprising extracting data from any of the plurality of data files and populating the extracted data in an associated data file.

31. The method according to claim 29, wherein the managing of versions comprises logging time stamps at which any of the associated data files have been processed.

32. The method according to claim 31, wherein the releasing of a version comprises comparing the time stamps for any of the plurality of data files with the latest time stamp of their associated data files.

33. The method according to claim 29, wherein the managing of versions comprises comparing contents of any of the plurality of data files and their associated data files with current versions thereof.

34. An article of manufacture, comprising:
a computer usable medium containing computer readable program code means embodied therein for managing how current files of a product are at time of release, the computer readable program code means in the article of manufacture comprising:
computer readable program code means for generating a plurality of data files, wherein each data file has an arbitrarily association with the other data files;
computer readable program code means for defining dependencies for the arbitrary associations between each of the plurality of data files;
computer readable program code means for managing versions of the plurality of data files in accordance with the defined dependencies; and
computer readable program code means for releasing a version of any of the plurality of data files that is current with the latest version of another associated data file.

35. The article of manufacture according to claim 34, further comprising computer readable program code means for extracting data from any of the plurality of data files and populating the extracted data in an associated data file.

36. The article of manufacture according to claim 34, wherein the managing computer readable program code means comprises computer readable program code means for logging time stamps at which any of the associated data files have been processed.

37. The article of manufacture according to claim 36, wherein the releasing computer readable program code means comprises computer readable program code means for comparing the time stamps for any of the plurality of data files with the latest time stamp of their associated data files.

38. The article of manufacture according to claim 34, wherein the managing computer readable program code means comprises computer readable program code means for comparing contents of any of the plurality of data files and their associated data files with current versions thereof.

* * * * *